Sept. 2, 1952  K. K. KEARBY  2,609,060
ADSORBENT-COVERED FURNACE
Filed June 4, 1947
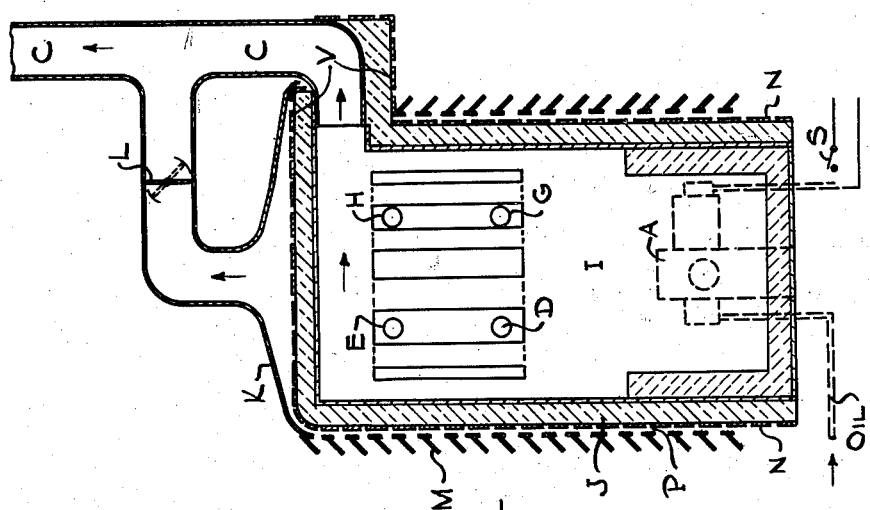
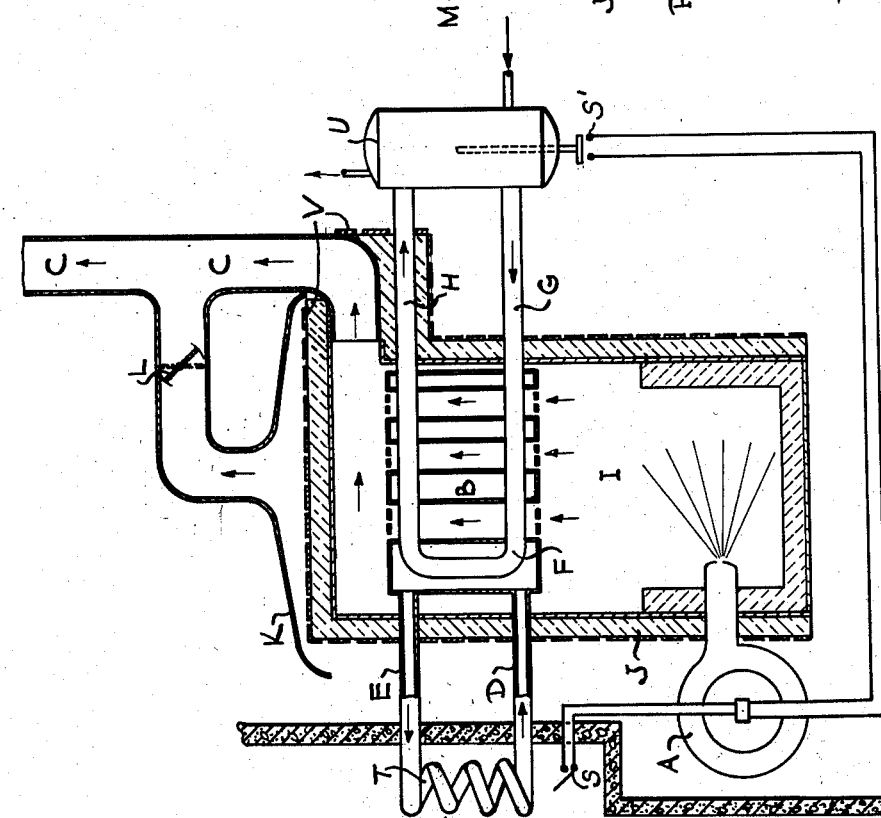
Kenneth K. Kearby Inventor
By L. F. Marx Attorney Patented Sept. 2, 1952

2,609,060

UNITED STATES PATENT OFFICE 2,609,060

ADSORBENT-COVERED FURNACE

Kenneth K. Kearby, Cranford, N. J.

Application June 4, 1947, Serial No. 752,476

23 Claims. (Cl. 183—4.5)

This invention relates to the art of air conditioning and, more particularly, to a method and apparatus for drying air.

It is the general object of the present invention to provide a novel adsorption system adapted to reduce the content of moisture and other adsorbable components in the atmosphere of a closed building.

More particularly, it is an object of the invention to provide a novel method and apparatus for air dehumidification and purification within a building, wherein the adsorbent material is periodically activated by heat normally available and produced within the building for other purposes.

A specific application of the invention consists in utilizing the heating cycle of a heating device, such as a furnace or hot water heater normally available within a building to activate an adsorbent, which dehumidifies and purifies the surrounding air during periods of idleness of said heating device.

In various parts of the United States and other parts of the world, climatic conditions exist which result in excessive humidity within many buildings. This condition is particularly serious in the basements of buildings during the summer months, and literally thousands of such basements become damp and so unhealthy that they are practically useless for periods of 4 to 6 months. Since basements frequently constitute a third to a half of the total useful space of a dwelling, it is apparent that this condition results in a loss of considerable investment to the owner. Furthermore, excessive humidity in basements causes losses due to corrosion, mildew, moulding, etc. Frequently, owners of dwellings are forced by excessive humidity to insulate dripping water pipes, which results in additional expenditures. It is thus apparent that an adequate reduction of the humidity of the air in excessively damp parts of a building constitutes an important problem.

Prior to the present invention, the drying of the air in buildings has been accomplished by expensive and tedious methods. For example, refrigerative air-conditioning equipment or cold water dehumidifiers have been used which usually require the purchase of expensive equipment and the payment of high utility costs. The use of drying agents, such as anhydrous calcium chloride involves frequent purchases of this compound, and has the disadvantage of forming a messy solution which must be disposed of. Other methods suggested for drying areas within a building by means of an adsorbent require large amounts of absorbent and specially constructed buildings which have a definite orientation with respect to the sun, the adsorbent being regenerated by the heat of the sun. Arrangements of this type are expensive and of low average efficiency because the adsorbent is most needed during periods of cloudy weather and rain and no regeneration is possible during such periods.

In accordance with the present invention, these difficulties may be overcome, quite generally, by contacting building air which contains undesirable adsorbable constituents with a heat-regeneratable adsorbent for these constituents, heating the adsorbent material by heat generated for other purposes during cycles alternating between heat-generating and cooling-off periods, in such a manner that undesirable air constituents are adsorbed by the adsorbent during cooling periods and adsorbed constituents are expelled from the adsorbent during heating periods, and removing expelled constituents from the building.

A preferred embodiment of the present invention comprises placing an adsorbent material outside, but in suitable heat exchange with a heat-generating device such as a furnace, hot water heater, flue pipe, or the hot elements of a refrigerator or heat pumping device in such a manner that the adsorbent is heated during operation or heat-generating cycles of these devices to release adsorbed vapors which are exhausted, preferably, to the outside atmosphere. A particularly convenient means for exhausting the desorbed vapors is obtained in the case of furnaces and hot water heaters by utilizing thermal convection effects, for example in the form of excess draft from the chimney. However, mechanically operated pneumatic means such as fans, pumps, etc. may, likewise, be employed in place of or in addition to arrangements utilizing convection effects. During periods when these devices are idle or cooling off, the adsorbent becomes cooler and adsorbs vapors from the surrounding atmosphere.

Since the drying of basements is required most frequently during summer months when heat may not be required in buildings, this invention is particularly applicable in combination with hot water heaters. It is especially easily applied in combination with an oil or gas fired steam boiler which is used during the summer months to heat water by means of a conventional secondary heat transfer device between the boiler and the hot water reservoir. Examples of this embodiment of the invention are illustrated in Figs. 1 and 2.

Fig. 1 shows an oil burner A firing a steam chest B, the hot combustion gases passing through flue pipe C to the chimney. Steam leaves at E to be passed to the heating element T of the building and condensate returns to the boiler at D. An auxiliary heating coil F is provided within combustion chamber I, for example within steam chest B for heating cold water which enters at G from a water storage tank U, and heated water leaves at H to be returned to the water storage tank U. Steam chest B may also serve to heat water for circulation to hot water radiators. Alternatively, provision may be made for hot water or steam from the steam chest B to pass outside the steam chest and heat the cold water by means of a heat transfer device. The elements described up to this point are those of conventional heating and hot water installations of buildings.

In accordance with the present invention, the combustion chamber I is provided on its outside with a layer J of an adsorbent material, which may vary from about ¼ inch in thickness up to about 3 inches or more. The adsorbent material may be arranged within a perforated metal wall, or a suitable wire network, or any other porous retaining walls or it may consist of a porous rigid mass which does not require a retaining wall and through which air can diffuse freely, in a manner obvious to those skilled in the art. Above the adsorbent-heater combination is a hood arrangement K which is connected to a draft regulator L, which is preferably automatically controlled as a function of changes in the intensity of the draft.

When burner A is in action, the adsorbent J is heated and releases adsorbed vapors which are drawn upwardly by the chimney draft through hood K past regulator L to pipe C leading to the chimney. When sufficient hot water has been prepared and burner A shuts off, the adsorbent J cools down and adsorbs moisture and odorous vapors from the surrounding air. Conventional controls such as thermostatically operated switches S and S' which turn the burner on when heat is required in the room heated by heating element T or when the storage tank U is about half full of cold water and turn it off when no more heat is required or when the tank is completely full of hot water. This provides a schedule suitable for the adsorption-desorption cycle in accordance with the present invention. Even in cases in which the burner is turned on at very frequent intervals, e. g. during peaks of heat or hot water demand, a cooling and drying period of sufficient length for the purposes of the invention will normally be provided at night.

Fig. 2 illustrates an arrangement similar to that of Fig. 1, like reference characters indicating like elements, except that hood K for the withdrawal of the desorbed vapors cooperates with means permitting a more positive draft through the adsorbent. For this purpose, adsorbent J is surrounded by louvres, the vanes M of which open and close automatically when the heat is off and on respectively. The closing of the vanes causes a positive flow of air from the open lower portion N of layer J along the adsorbent layer J to pipe C, thus generating a relatively strong updraft whereby desorbed vapors are efficiently removed from the system. The opening and closing of vanes M may be thermostatically controlled as a function of the temperature of layer J or any other suitable portion of the system in a manner known per se. Vanes M may also be removed by a certain distance from layer J in order to provide for a vertical free passage P of air between layer J and the vanes M.

Any high capacity adsorbent material may be used in this device. Inorganic oxidic adsorbents such as silica gel, activated alumina, activated bauxite and activated hydrous oxide gels are preferred materials, but such materials as active clays, calcium sulfate, charcoal, etc. may be used in many cases. The selection of the most suitable adsorbent depends mainly on the expected average temperature prevailing during the adsorption period. This average temperature will normally lie between the temperature of the surrounding air and a temperature of about 225° F. It has been found that silica gel, activated alumina and bauxite exhibit the highest adsorptive power within this temperature range and are, therefore, most suitable for the purposes of the invention. The temperatures available during the heating cycle of the heating devices here involved are, in all practical cases, high enough to permit sufficient reactivation of all adsorbents mentioned above. An optimum porosity and thickness will exist for each of these materials depending on its heat transfer characteristics and the rate of diffusion of air within the adsorbent. The optimum thickness of the adsorbent layer will normally be between ¼ and 2 inches.

It is thus apparent that this invention makes use of heat that might normally be wasted, to regenerate an air conditioning adsorbent. Use may also be made of an existing chimney draft and costly exhausting fans are not required. Damp areas within buildings, such as basements, may thus be kept dry automatically by utilizing existing equipment with relatively inexpensive modifications.

Many alternative ways of applying this invention will fall within its scope. For example, the invention is applicable in combination with heaters which function for the sole purpose of heating hot water and which are not an integral part of the furnace which heats the building. In the case of existing heaters, a highly economical application of this invention comprises placing adsorbent material around the flue pipe of such heaters and making provision for a withdrawal of the desorbed vapors up the chimney in a manner generally analogous to that outlined above as schematically indicated at V in Figs. 1 and 2. Where dry air is required in other parts of the building, it may be dried at the heater substantially as described above and then passed through ducts by forced flow or natural convection to the location where it is required. It is also within the purview of the invention to operate existing heating equipment for the sole purpose of regenerating the adsorbent, by shutting off the ducts which normally conduct the heat to other locations.

I claim:

1. In a method of removing undesirable adsorbable constituents from air in a building in which heat for purposes unrelated to said method is generated by a heating device located within said building in cycles alternating between heat-generating and cooling-off periods responsive to heat requirements in said building, the improvement which comprises contacting building air containing said constituents with a heat-regeneratable adsorbent for said constituents, heating said adsorbent with heat generated by said device directly responsive to and during said heat-generating periods, permitting said adsorbent to cool as the effect of and during said cooling-off periods, said heat-generating and cooling-off periods being essentially responsive to said unrelated purposes, whereby at least a portion of said constituents is adsorbed by said adsorbent during said cooling-off periods and adsorbed constituents are expelled from said adsorbent during said heat-generating periods, and removing said expelled constituents from said building.

2. The method of claim 1 in which said expelled constituents are removed from said building by contacting a stream of air with said adsorbent during said heating periods and removing said stream from said building after contact with said adsorbent.

3. The method of claim 2 in which said stream is propelled by convection effects.

4. The method of claim 3 in which said stream is removed from said building by means of a draft resulting from said heat generation.

5. The method of claim 1 in which said material is an inorganic oxidic material having a high adsorbent power for water vapor.

6. The method of claim 5 in which said material is silica gel.

7. The method of claim 5 in which said material essentially comprises active alumina.

8. In a method of drying moist air in a building in which heat for purposes unrelated to said method is generated by a heating device located within said building in cycles alternating between heat-generating and cooling-off periods responsive to heat requirements in said building, the improvement which comprises contacting moist building air with a moisture-absorbing material regeneratable by heating, heating said material at intervals with heat generated by said device directly responsive to and during said heat-generating periods, permitting said material to cool directly responsive to and during said cooling-off periods, said heat-generating and cooling-off periods being essentially responsive to said unrelated purposes, whereby moisture is adsorbed by said material during said cooling-off periods and moisture is expelled from said material during said heat-generating periods, and removing said expelled moisture from said building.

9. The method of claim 8 in which said adsorbent is in heat exchange with a source of said heat.

10. A system for conditioning air in a building, which consists essentially of a heating device operating in cycles within a closed room containing air to be conditioned and supplying heat to said building outside said device at a relatively high temperature above the temperature outside said building, a layer of vapor-adsorbent material arranged in heat exchange with said device and in open contact with said air, means for controlling said cycles as a function of said high temperature heat requirements in said building, and means for withdrawing from said room vapors expelled from said layer.

11. The system of claim 10 which comprises means cooperating with said device for supplying heat to locations outside said room.

12. In combination with a heating device operating in cycles as a function of the heat requirements in a building outside said device, said heat being of relatively high temperature above the temperature outside said building, a layer of vapor-adsorbent material arranged in heat exchange with said device and in open contact with air surrounding said device, and means cooperating with said device for removing from the space adjacent said device vapors liberated from said layer.

13. The combination of claim 12 in which said heating device comprises a draft pipe, and said vapor removing means discharges into said draft pipe.

14. The combination of claim 13 in which said vapor removing means comprises flow control means, and said flow control means is responsive to the draft in said draft pipe.

15. A system for conditioning air in a building, which comprises a combustion chamber, a burner firing said combustion chamber, means containing a heat exchange fluid, arranged within said combustion chamber, means for circulating said heat exchange fluid between said containing means and a place of heat utilization outside said combustion chamber, control means for operating said burner as a function of the temperature at said place, a draft pipe connected to said combustion chamber, a layer of vapor-adsorbent material outside said combustion chamber arranged in heat exchange with at least a substantial portion of the walls of said combustion chamber and in open contact with air surrounding said combustion chamber, a hood covering the top of said combustion chamber and of said layer, a pipe connecting said hood with said draft pipe, and flow control means arranged within said pipe and responsive to the draft within said draft pipe.

16. The system of claim 15 which comprises louvre-vanes covering a major portion of that surface of said layer which is in open contact with said air, said louvre-vanes being responsive to the temperature of said layer so as to be closed at a non-adsorptive layer temperature and opened at an adsorptive layer temperature.

17. The system of claim 16 in which said louvre-vanes are arranged in a spaced relationship to said surface.

18. The system of claim 15 in which said layer is about 1/4-3 inches thick.

19. The system of claim 10 in which said vapor withdrawing means comprises louvre-vanes covering a major portion of that surface of said layer which is in open contact with said air, said louvre-vanes being responsive to said cycles so as to be closed during heating periods and opened during non-heating periods.

20. A system for conditioning air in a building, which comprises a heating device having hot outside walls, a combustion chamber, gas ducts connected to said combustion chamber for carrying hot combustion gases from said chamber, said combustion chamber and gas ducts forming parts of said device, a burner firing said combustion chamber, means containing a heat exchange fluid arranged within said heating device, means for circulating said heat exchange fluid between said containing means and a place of heat utilization outside said device, control means for operating said burner as a function of the temperature at a place outside said device within said building, a layer of vapor-adsorbent material outside said device arranged in heat exchange with at least a substantial portion of said hot walls and in open contact with the air surrounding said device, and air conducting means actuated by said device, said air conducting means having its intake adjacent said layer and its exhaust outside said building and cooperating with said device to remove from said building vapors expelled from said layer.

21. A system for conditioning air in a building, which comprises a heating device having hot outside walls, a combustion chamber, gas ducts connected to said combustion chamber for carrying hot combustion gases from said chamber, said combustion chamber and gas ducts forming parts of said device, a burner firing said combustion chamber, means containing a heat exchange fluid, arranged within said heating device, means for circulating said heat exchange fluid between said containing means and a place of heat utilization outside said device, control means for operating said burner as a function of the temperature at a place outside said device within said building, a layer of vapor-adsorbent material outside said device arranged in heat exchange with at least a substantial portion of said hot walls and in open contact with the air surrounding said device, a draft pipe connected to said ducts, a hood covering the top of said layer, a pipe connecting said hood with said draft pipe, and flow control means arranged within said pipe and responsive to the draft within said draft pipe.

22. The system of claim 21 in which said layer is arranged in heat exchange with said combustion chamber.

23. The system of claim 21 in which said layer is arranged in heat exchange with said draft pipe.

KENNETH K. KEARBY.

REFERENCES CITED

The following references are of record in the file of this patent:

UNITED STATES PATENTS

| Number | Name | Date |
|---|---|---|
| 1,081,227 | Foster | Dec. 9, 1913 |
| 2,328,521 | Wittmann | Aug. 31, 1943 |
| 2,377,333 | Erland et al. | June 5, 1945 |
| 2,462,952 | Dunkak | Mar. 1, 1949 |